United States Patent
Li et al.

(10) Patent No.: US 11,149,680 B1
(45) Date of Patent: Oct. 19, 2021

(54) WEAK TUMBLE FLOW FAST COMBUSTION SYSTEM AND GAS ENGINE

(71) Applicant: WEICHAI POWER CO., LTD., Shandong (CN)

(72) Inventors: Wei Li, Weifang (CN); Shun Lv, Weifang (CN); Jie Pan, Weifang (CN); Yungang Li, Weifang (CN); Yongliang Gao, Weifang (CN); Tao Liu, Weifang (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/195,227

(22) Filed: Mar. 8, 2021

(30) Foreign Application Priority Data

May 13, 2020 (CN) .......................... 202010399954.X (51) Int. Cl.
  *F02B 19/08* (2006.01)
  *F02F 1/42* (2006.01)
  *F02F 3/26* (2006.01)
(52) U.S. Cl.
  CPC .............. *F02F 1/4235* (2013.01); *F02F 3/26* (2013.01)
(58) Field of Classification Search
  CPC ............ F02B 2275/48; F02B 2023/106; F02B 2023/108; F02F 1/4235; F02M 35/10262; F02D 41/0002
  USPC ........................................................ 123/262
  See application file for complete search history.

(56) References Cited

U.S. PATENT DOCUMENTS

| | | | |
|---|---|---|---|
| 2005/0081822 A1* | 4/2005 | Yageta | F02B 31/06 123/308 |
| 2010/0037846 A1* | 2/2010 | Kobori | F02D 41/0002 123/184.56 |
| 2014/0261319 A1* | 9/2014 | Kimura | F02D 37/02 123/406.45 |
| 2017/0145949 A1* | 5/2017 | Sczomak | F02D 41/0097 |
| 2019/0226388 A1* | 7/2019 | Kanno | F02F 1/4235 |
| 2019/0383207 A1* | 12/2019 | Nakahara | F02F 1/42 |

FOREIGN PATENT DOCUMENTS

| | | |
|---|---|---|
| CN | 104879233 A | 9/2015 |
| CN | 205013118 U | 2/2016 |
| CN | 205532872 U | 8/2016 |
| CN | 208749442 U | 4/2019 |

(Continued)

*Primary Examiner* — Long T Tran
*Assistant Examiner* — James J Kim
(74) *Attorney, Agent, or Firm* — Fenwick & West LLP (57) ABSTRACT

A weak tumble flow fast combustion system is provided. An intake throat and an exhaust throat are provided on a cylinder head, a section of an intake duct close to the intake throat is a tumble guide duct, an axis of the tumble guide duct is arranged obliquely with respect to the bottom surface of the cylinder head, and an upper side surface of the tumble guide duct is a flowing-down guide surface arranged obliquely with respect to the bottom surface of the cylinder head, a lower side surface of the tumble guide duct is an arc-shaped guide surface recessed toward the bottom surface of the cylinder head, an eccentric chamfer is provided at the lower end of the intake throat, and the eccentric direction of the eccentric chamfer is offset along the direction connecting the center of the intake throat to the exhaust throat.

10 Claims, 9 Drawing Sheets

(56) References Cited

FOREIGN PATENT DOCUMENTS

| | | |
|---|---|---|
| CN | 209195568 U | 8/2019 |
| CN | 209483494 U | 10/2019 |
| JP | 2010-174702 A | 8/2010 |

\* cited by examiner

Figure 1

(RELATED ART)

WEAK TUMBLE FLOW FAST COMBUSTION SYSTEM AND GAS ENGINE

CROSS REFERENCE TO RELATED APPLICATIONS

This application claims priority to Chinese Patent Application No. 202010399954.X, titled "WEAK TUMBLE FLOW FAST COMBUSTION SYSTEM AND GAS ENGINE", filed with the China National Intellectual Property Administration on May 13, 2020, which is hereby incorporated by reference in its entirety.

FIELD

The present application relates to the technical field of engines, and in particular to a weak flow fast combustion system and a gas engine.

BACKGROUND

At present, a natural gas engine is generally modified on the basis of a diesel engine, and the cylinder head part often directly adopts the original cylinder head of the diesel engine. For the diesel engine, its combustion mode is diffusion combustion, and a certain degree of vortex helps the oil jet to mix with air, thereby improving the combustion process and reducing pollutant emissions. Vortex refers to an organized swirling movement of gas around the cylinder axis. Gas fuel combustion is essentially premixed combustion, which does not require high vortex intensity, and requires small-scale turbulence movement to form flame folds, thereby increasing the speed of flame propagation and improving thermal efficiency. Turbulence refers to many small swirls with unfixed directions generated in the flow field if the air velocity is high, which is different from laminar flow.

Figure 1:
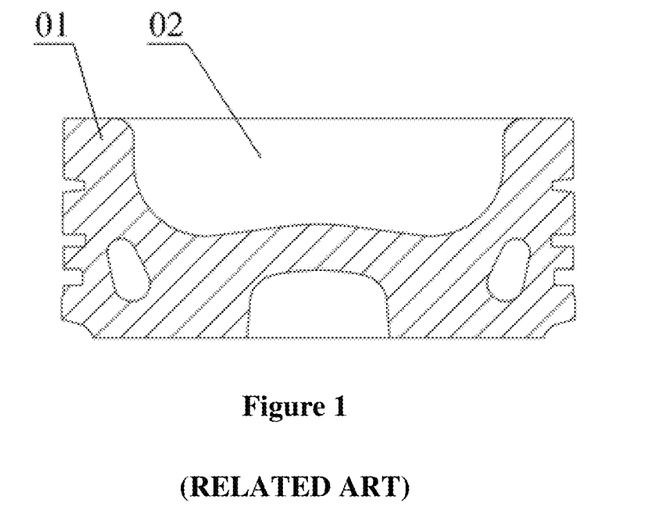
FIG. 1 is a schematic diagram of the structure of a piston and a combustion chamber of a conventional gas engine.

If the natural gas engine adopts the cylinder head of the diesel engine, the formed vortex may not be broken in the compression and power stroke, which does not make full use of the energy of airflow movement, easily causes the intensification of cycle changes, and adversely affects the reliability of the whole engine. As shown in FIG. 1, the piston 01 of the existing gas engine is generally modified on the basis of the piston of a diesel engine, and the combustion chamber 02 mostly adopts a shallow basin structure, which has a simple shape and good manufacturability. The combustion chamber 02 of this structure may make full use of squeeze flow to increase the turbulent kinetic energy in the cylinder, thereby improving the combustion process. Squeeze flow refers to the centripetal movement formed by the piston squeezing the gas near the edge of the cylinder into the combustion chamber at the end of the compression stroke.

In a current solution, during the intake process, the intake airflow injected from the duct generates vortex motion around the cylinder axis, and with the upward motion of the piston, the vortex is squeezed into the combustion chamber, and the intensity of the vortex is continuously improved by the combustion chamber with the shallow basin structure, and in the process, the vortex may not break into small-scale turbulence. However, for gas engines, small-scale turbulence plays an important role in flame propagation, so the solution is not conducive to the combustion of gaseous fuels. Meanwhile, limited by the slow flame propagation speed, the engine has a high tendency to knock, and it is impossible to use a high compression ratio piston to further improve thermal efficiency.

Therefore, a technical issue to be addressed presently by those skilled in the art is to improve the combustion characteristics of the gas and increase the thermal efficiency of the gas engine.

SUMMARY

In view of this, the present application is to provide a weak tumble flow fast combustion system, which may accelerate the flame propagation speed, improve the combustion characteristics, increase the gas utilization rate, and further improve the thermal efficiency of the gas engine. The present application is further to provide a gas engine including the above-mentioned weak tumble flow fast combustion system.

Following technical solutions are provided according to the present application.

A weak tumble flow fast combustion system includes a piston, a cylinder head, an intake duct and an exhaust duct. A combustion chamber is formed between the top of the piston and the cylinder head, an intake throat and an exhaust throat are provided on the cylinder head, a section of the intake duct close to the intake throat is a tumble guide duct, an axis of the tumble guide duct is arranged obliquely with respect to the bottom surface of the cylinder head, and an upper side surface of the tumble guide duct is a flowing-down guide surface arranged obliquely with respect to the bottom surface of the cylinder head, a lower side surface of the tumble guide duct is an arc-shaped guide surface recessed toward the bottom surface of the cylinder head, an eccentric chamfer is provided at the lower end of the intake throat, and the eccentric direction of the eccentric chamfer is offset along the direction of a line of connecting the center of the intake throat to the exhaust throat.

In one embodiment, a radius of curvature of the arc-shaped guide surface is 60-80 mm, and an included angle between the flowing-down guide surface and the bottom surface of the cylinder head is 40 degrees-80 degrees.

In one embodiment, an eccentric distance of the eccentric chamfer with respect to the intake throat is 1 mm-3 mm.

In one embodiment, the piston is a piston having a dish combustion chamber, a dish recessing structure is provided at the top of the piston having the dish combustion chamber, and a cross-sectional width of the dish recessing structure from the bottom to the top gradually increases; or, the piston is a piston having the reentrant combustion chamber, a reentrant recessing structure is provided at the top of the piston having the reentrant combustion chamber, and a cross-sectional width of the reentrant recessing structure from the bottom to the top gradually decreases.

In one embodiment, if the piston is a piston having a dish combustion chamber, a side wall of the dish recessing structure is a tapered surface structure arranged around an axis of the piston, and an inclination angle of the longitudinal section of the side wall of the dish recessing structure relative to the axis of the piston is 10-15 degrees;
if the piston is the piston having the reentrant combustion chamber, the ratio of a top opening width of the reentrant recessing structure to an outer diameter of the piston is 0.53.

In one embodiment, the intake duct includes a main intake duct, an inner intake duct, and an outer intake duct. The inner intake duct and the outer intake duct are branched downstream of the main intake duct, the air inlet port of the main intake duct is communicated with the air inlet stabilizing cavity, the inner intake duct is closer to the air inlet stabilizing cavity than the outer intake duct, and the communication capacity of the inner intake duct is greater than the communication capacity of the outer intake duct, an injection hole is opened on one side of the outer intake duct or the side, facing the air inlet stabilizing cavity, of the main intake duct, and the injection hole communicates with the air inlet stabilizing cavity through a bypass duct.

In one embodiment, the outer intake duct is a tangential duct and the inner intake duct is a straight duct, and the projection of the extending direction of the straight duct on the bottom surface of the cylinder head is consistent with a direction of a central connecting line of the intake throat and the exhaust throat.

In one embodiment, a flow regulating valve is arranged on the bypass duct.

In one embodiment, an equivalent flow cross-section of the bypass duct is gradually reduced from the air inlet stabilizing cavity to the injection hole.

The working principle of the weak tumble flow fast combustion system provided by the present application is as follows: when the engine cylinder inhales, the intake valve opens, and the intake airflow in the intake duct enters the cylinder through the intake throat. When the intake airflow passes through the tumble guide duct, the flowing-down guide surface makes the airflow flow in an oblique direction, meanwhile, the arc-shaped guide surface at the lower side of the tumble guide duct makes the airflow roll. When the airflow reaches the intake throat, the eccentric chamfer structure at the lower end of the intake throat further guides the tumbling airflow downward and makes the airflow form a large-scale weak tumble flow movement in the cylinder; In the compression stroke of the engine, with the piston going up, the gas with weak tumble flow is squeezed into the combustion chamber. At the end of the compression stroke, the tumble flow is crushed into more small-scale turbulence after being squeezed by the piston. With the increase of small-scale turbulence, the gas may generate higher turbulent kinetic energy, increase the speed of flame propagation and shorten the combustion duration, thus improving the combustion characteristics, improving the gas utilization rate and the thermal efficiency of the gas engine.

The fast combustion characteristics of the weak tumble flow fast combustion system of the present application break through the knock bottleneck of the traditional combustion mode, and may allow the use of pistons with higher compression ratio (the compression ratio may be increased by 10%), and the knock is defined in a certain range; the present application further improves the utilization rate of fuel gas, and reduces the gas consumption in normal working conditions by 2%~3% on average. In addition, considering the product feasibility, the present application generates corresponding weak tumble flow on the basis of the existing diesel engine by changing the intake duct structure in the cylinder head, as the present application only needs to modify the structure of the intake duct, the structures of the intake valve, the exhaust valve, the exhaust duct and the like do not need to be changed, and the positions of fastening bolt holes of the cylinder head and the engine body remain unchanged, so that all external interfaces of the cylinder head may be ensured to remain unchanged, therefore, it may be ensured that the air distribution mechanism and the air system are maintained as they are, thereby greatly reducing the cost of product design changes and improving product feasibility. The present application further provides a gas engine including the above-mentioned weak tumble flow fast combustion system. The derivation process of the beneficial effects produced by the gas engine is generally similar to the derivation process of the beneficial effects brought about by the weak tumble flow fast combustion system, so it may not be repeated here.

BRIEF DESCRIPTION OF THE DRAWINGS

To illustrate technical solutions according to the embodiments of the present application or in the conventional technology more clearly, the drawings to be used in the description of the conventional technology or the embodiments are described briefly hereinafter. Apparently, the drawings described hereinafter are only some embodiments of the present application, and other drawings may be obtained by those skilled in the art based on those drawings without any creative effort.

in FIG. 1:

| 01 | piston, |
| 02 | combustion chamber; |

Reference numerals in FIGS. 2 to 11:

| 10 | piston, | 11 | cylinder head, |
| 111 | intake throat, | 112 | exhaust throat, |
| 113 | eccentric chamfer, | 12 | combustion chamber, |
| 13 | intake valve, | 14 | intake duct, |
| 140 | main intake duct, | 141 | inner intake duct, |
| 142 | outer intake duct, | 15 | exhaust valve, |
| 16 | exhaust duct, | 17 | tumble guide duct, |

| | | | |
|---|---|---|---|
| 18 | arc-shaped guide surface, | 19 | flowing-down guide surface, |
| 20 | dish recessing structure, | 21 | injection hole, |
| 22 | bypass duct, | 23 | air inlet stabilizing cavity, |
| 24 | reentrant recessing structure. | | |

DETAILED DESCRIPTION

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments of the present disclosure, all of other embodiments, made by those skilled in the art without any creative efforts, fall into the scope of protection of the present disclosure.

Figure 2:
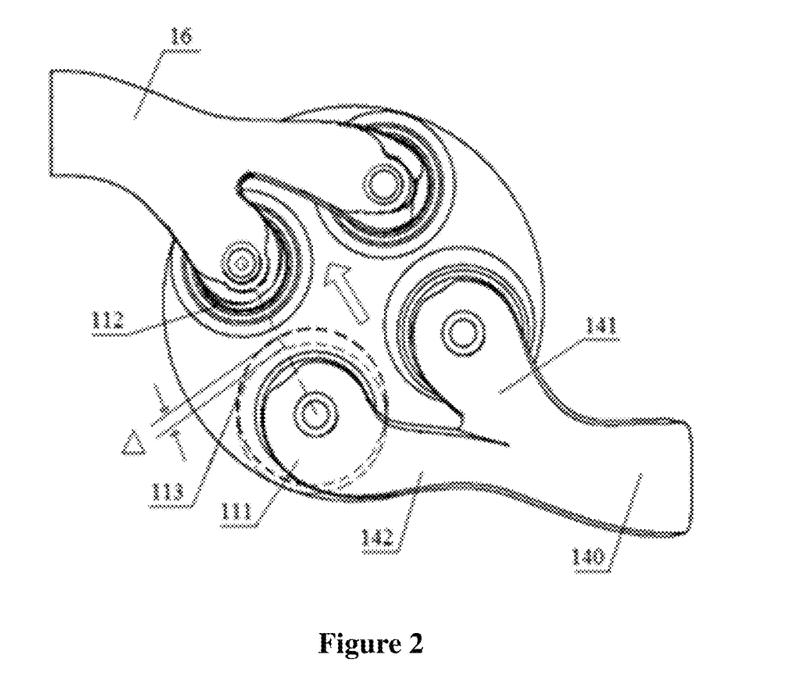
FIG. 2 is a schematic diagram of the eccentric position of an eccentric chamfer according to one embodiment of the present application.
Figure 3:
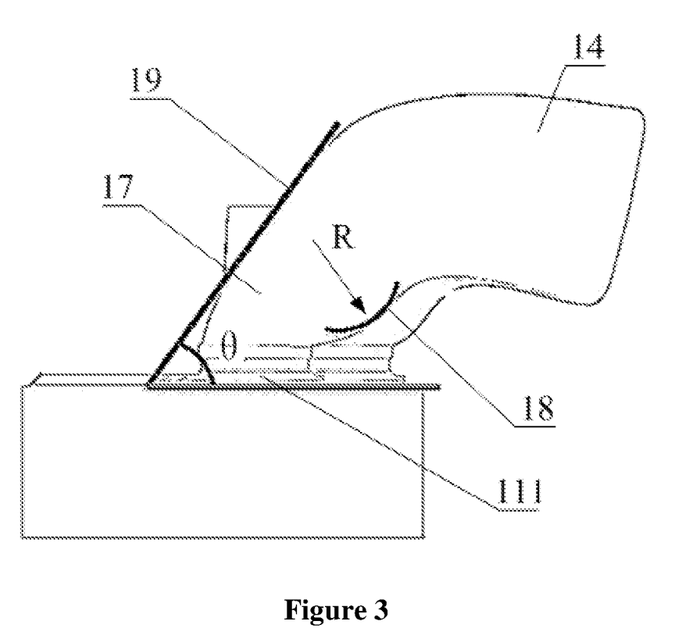
FIG. 3 is a schematic structural diagram of a tumble guide duct according to one embodiment of the present application.
Figure 4:
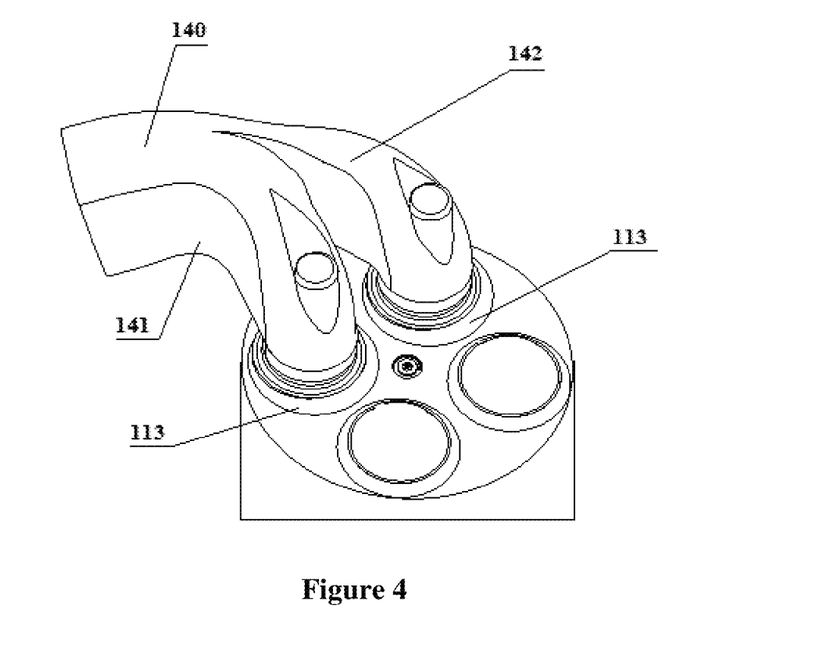
FIG. 4 is a schematic structural diagram of an intake duct in according to one embodiment of the present application.
Figure 5:
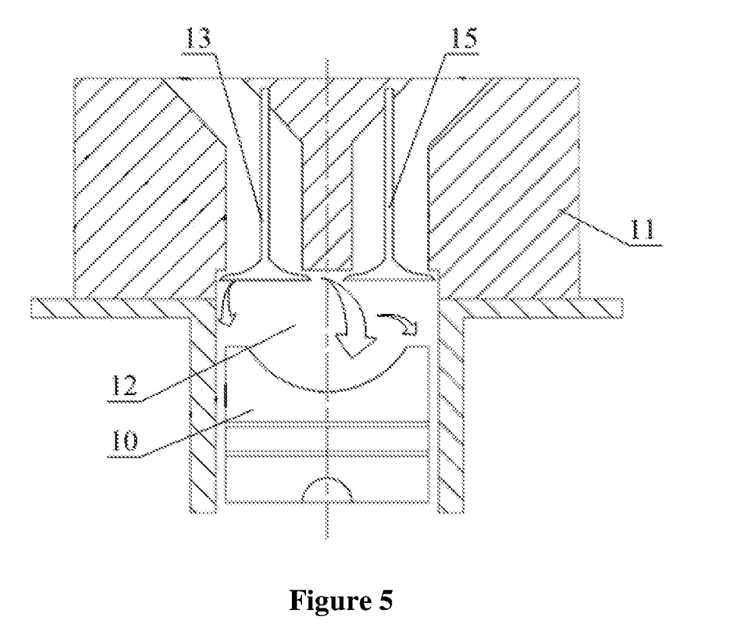
FIG. 5 is a schematic diagram of the working state of the combustion system with a piston having a dish combustion chamber according to one embodiment of the present application.
Figure 6:
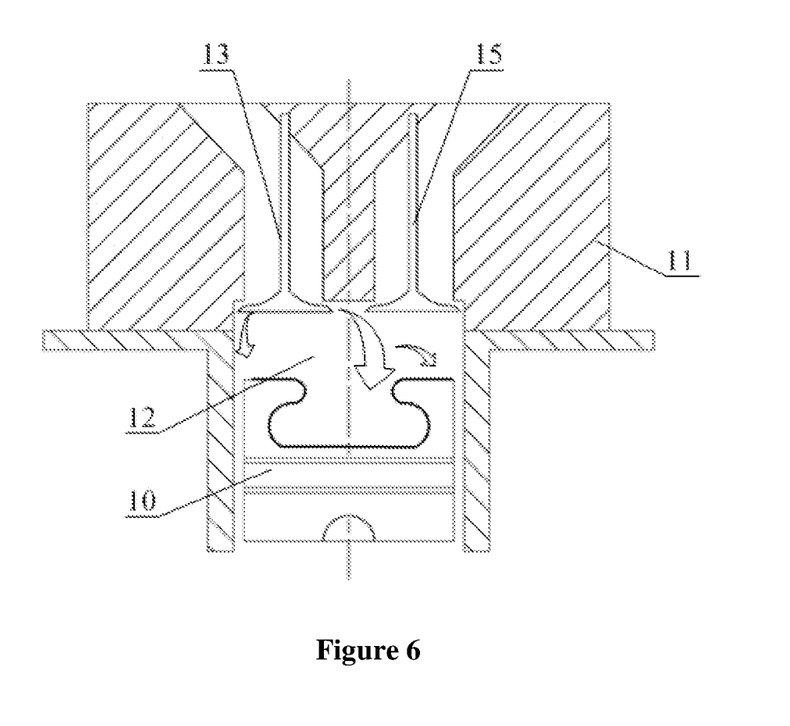
FIG. 6 is a schematic diagram of the working state of the combustion system with a piston having a reentrant combustion chamber according to one embodiment of the present application.
Figure 9:
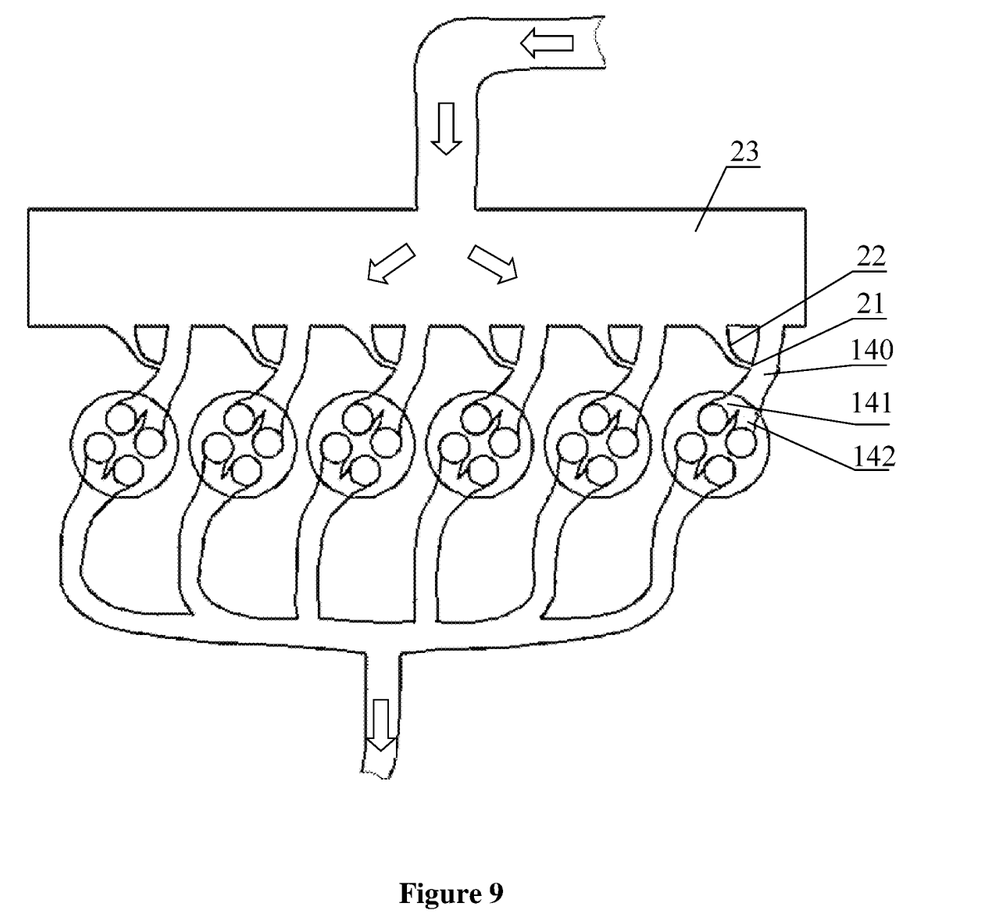
FIG. 9 is a schematic diagram of the arrangement structure of an intake duct and a bypass duct according to one embodiment of the present application.

Referring to FIG. 2 to FIG. 9, FIG. 2 is a schematic diagram of an eccentric position of an eccentric chamfer according to one embodiment of the present application; FIG. 3 is a schematic structural diagram of a tumble guide duct according to one embodiment of the present application; FIG. 4 is a schematic structural diagram of an intake duct according to one embodiment of the present application; FIG. 5 and FIG. 6 are schematic diagrams of the working state of the combustion system with a piston having a dish combustion chamber and a piston having a reentrant combustion chamber according to one embodiment of the present application, respectively; FIG. 9 is a schematic diagram of the arrangement structure of the intake duct and the bypass duct according to one embodiment of the present application.

As shown in FIG. 2 to FIG. 9, the present application provides a weak tumble flow fast combustion system, which includes a piston 10, a cylinder head 11, an intake duct 14 and an exhaust duct 16. A combustion chamber 12 is formed between the top of the piston 10 and the cylinder head 11, an intake throat 111 and an exhaust throat 112 are provided on the cylinder head 11, the intake throat 111 is used for cooperating with an intake valve 13, and the exhaust throat 112 is used for cooperating with an exhaust valve 15. A section, close to the intake throat 111, of the intake duct 14 is a tumble guide duct 17, an axis of the tumble guide duct 17 is arranged obliquely with respect to the bottom surface of the cylinder head 11, and an upper side surface of the tumble guide duct 17 is a flowing-down guide surface 19 arranged obliquely with respect to the bottom surface of the cylinder head 11, a lower side surface of the tumble guide duct 17 is an arc-shaped guide surface 18 recessed toward the bottom surface of the cylinder head 11 (the shape is similar to a fish belly structure), an eccentric chamfer 113 is provided at the lower end of the intake throat 111, and the eccentric direction of the eccentric chamfer 113 is offset along a direction of a line of connecting the center of the intake throat 111 to the exhaust throat 112.

The working principle of the weak tumble flow fast combustion system provided by the present application is as follows: when the engine cylinder inhales, the intake valve 13 opens, and the intake airflow in the intake duct 14 enters the cylinder through the intake throat 111. When the intake airflow passes through the tumble guide duct 17, the flowing-down guide surface 19 makes the airflow flow be in an oblique direction, meanwhile, the arc-shaped guide surface 18 at the lower side of the tumble guide duct 17 makes the airflow roll. When the airflow reaches the intake throat 111, the eccentric chamfer 113 at the lower end of the intake throat 111 further guides the tumbling airflow downward and makes the airflow form a large-scale weak tumble flow movement in the cylinder; In the compression stroke of the engine, with the piston 10 going up, the gas with weak tumble flow is squeezed into the combustion chamber 12. At the end of the compression stroke, the tumble flow is crushed into more small-scale turbulence after being squeezed by the piston 10. With the increase of small-scale turbulence, the gas may generate higher turbulent kinetic energy, increase the speed of flame propagation and shorten the combustion duration, thus improving the combustion characteristics, improving the gas utilization rate and the thermal efficiency of the gas engine.

It is noted that those skilled in the art should understand that the tumble flow described herein refers to the swirling movement of gas around the direction perpendicular to the cylinder axis.

It is noted that the large-scale flow of gas in the cylinder described in this solution is a weak tumble flow, because the intensity of tumble flow formed by this solution is relatively weak when the tumble flow is compared to the tumble flow formed by the tangential duct of the gasoline engine with the roof-type combustion chamber. Therefore, it is defined as weak tumble flow.

Referring to FIG. 3, in a further embodiment, in one embodiment, the radius of curvature R of the arc-shaped guide surface 18 ranges from 60 mm to 80 mm; the included angle $\theta$ formed by the flowing-down guide surface 19 and the bottom surface of the cylinder head 11 ranges from 40 degrees to 80 degrees.

Referring to FIG. 2, in one embodiment, the eccentric distance A of the eccentric chamfer 113 relative to the intake throat 111 ranges from 1 mm to 3 mm. The eccentric distance A specifically refers to the distance that the center of the eccentric chamfer 113 offsets the center of the intake throat 111 along the central line between the intake throat 111 and the exhaust throat 112 toward the exhaust throat 112. Through the combination of the above parameters, the present application has been tested and verified, and the results may make the combustion system have better effect of forming and maintain weak tumble flow, and make the weak tumble flow break at the end of compression to generate higher turbulent kinetic energy, thus increasing the combustion speed and making the gas fuel burn more completely.

It is noted that the radius of curvature R, the included angle $\theta$, and the eccentric distance A should be within a reasonable range according to the product reliability design principle under the constraint of the arrangement of the intake duct 14 of the engine. The tumble ratio is generally required to be in the range of 1.0 to 1.5. It has been verified through experiments that the weak tumble ratio has the best effect in this range, and the combustion of gas fuel is more complete and thorough. Since the formation of tumble flow may result in a decrease in flow capacity, it is required that the reduction in the flow coefficient of the tumble guide duct 17 may not be less than 10% of the original duct.

Figure 7:
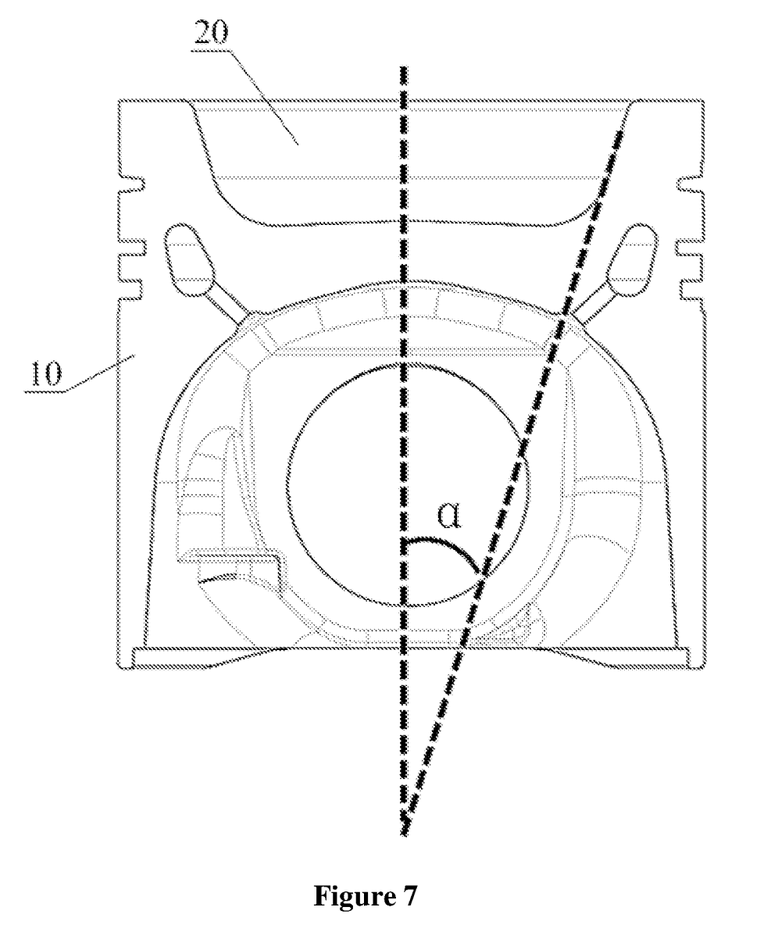
FIG. 7 is a schematic structural diagram of the piston having the dish combustion chamber according to one embodiment of the present application.
Figure 8:
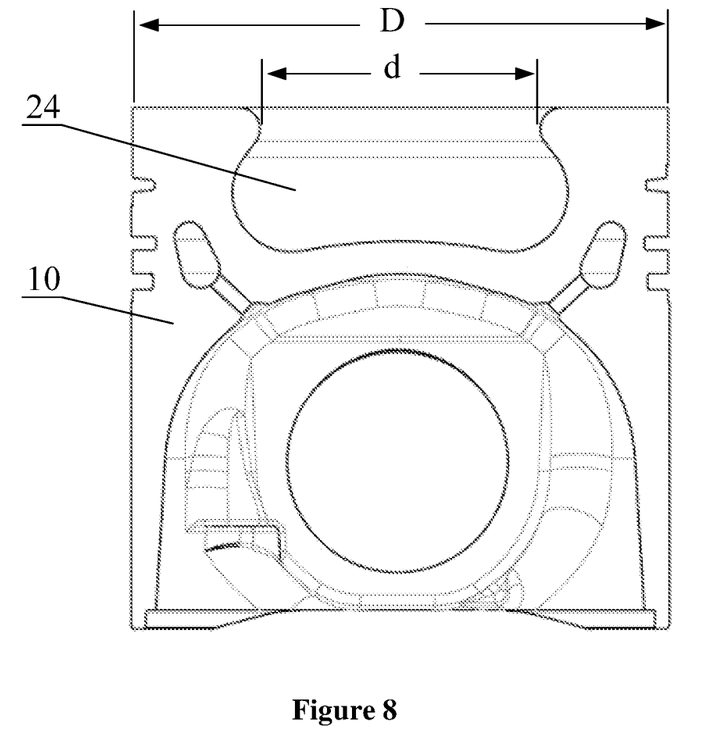
FIG. 8 is a schematic structural diagram of the piston having the reentrant combustion chamber according to one embodiment of the present application.

It is be noted that the piston 10 in this solution may be designed as a piston having a dish combustion chamber or a piston having a reentrant combustion chamber, a dish recessing structure 20 is provided at the top of the piston having the dish combustion chamber, and a cross-sectional width of the dish recessing structure 20 gradually increases from bottom to top; a reentrant recessing structure 24 is provided at the top of the piston having the reentrant combustion chamber, and a cross-sectional width of the reentrant recessing structure 24 is gradually reduced from the bottom to the top. Both the piston having the dish combustion chamber and the piston having the reentrant combustion chamber may break the tumble flow in the combustion chamber into small-scale turbulence at the end of compression, thus increasing the combustion speed.

It is noted that pistons are mainly divided into two categories based on their shapes, that is, a dish form and a reentrant form. The main reason for the formation of tumble flow is that the airflows on both sides of the intake valve 13 are not equal. On the side along the flow direction, the intake flow is relatively smooth, so the flow rate is large, while on the opposite side along the flow direction, the intake flow is not smooth, so the flow rate is small. These unequal flow rates on both sides of the intake valve may promote the formation of tumble flow. The piston having the dish combustion chamber is widely used in traditional gasoline engines and is suitable for tumble intake system. The purpose of adopting the piston having the dish combustion chamber in the present application is mainly because the intake air rushes into the cylinder after passing through tumble guide duct 17, in which most of the air flow enters the dish recessing structure 20 of the piston 10 (the flow direction of most air flow is indicated by hollow arrows pointing downward in FIG. 5), and a small part of air flow hits the upper surface of the piston 10 (as indicated by hollow arrows pointing to the upper end surface of the piston 10 on both sides in FIG. 5). The piston having the dish combustion chamber may guide the tumble flow to the greatest extent, so that the intake energy may be stored in the form of large-scale tumble flow, which is broken into small-scale turbulence at the end of compression to increase the turbulent kinetic energy, increase the speed of flame propagation, and ultimately improve thermal efficiency.

Referring to FIG. 7, in one embodiment, if the piston 10 is a piston having a dish combustion chamber, the side wall of the dish recessing structure 20 is of a tapered surface structure arranged around an axis of the piston 10, and the inclination angle α of the longitudinal section of the side wall of the dish recessing structure 20 relative to the axis of the piston 10 is defined as the opening ratio, and the value range of a is 10° ~15°. The compression ratio of the piston 10 may be increased by 10% through the design of the opening ratio.

Referring to FIG. 6 and FIG. 8, the piston 10 of the present application may also adopt a piston having a reentrant combustion chamber. The reentrant characteristic is mainly described by a reentrant ratio. In this solution, the ratio of the outer diameter D of the piston 10 to the top opening width d of the reentrant recessing structure 24 (i.e., D/d) is defined as the reentrant ratio. The larger the reentrant ratio is, the more obvious the reentrant characteristic is. The piston having the reentrant combustion chamber is often used in diesel engine combustion system, and is suitable for vortex intake system. Squeezing flow is formed at the end of compression by reentrant characteristic, which strengthens oil-gas mixing and realizes rapid combustion process. When the piston having the reentrant combustion chamber is adopted in the solution of the present application, the piston having the reentrant combustion chamber may increase the probability of airflow hitting the upper surface of the piston 10, which may result in the loss of intake energy and also reduce the air flow into the reentrant recessing structure 24, which further results in the reduction of the average turbulent kinetic energy formed after the tumble flow is broken, but the piston having the reentrant combustion chamber may form a squeeze flow, which may squeeze the surrounding airflow to the vicinity of the spark plug, thus improving the turbulent kinetic energy near the spark plug, which has a remarkable effect on accelerating flame propagation. In short, although the piston having the reentrant combustion chamber causes the tumble flow to weaken, which in turn reduces the average turbulent kinetic energy in the cylinder at the end of compression, the squeeze flow may be used for increasing the turbulent kinetic energy close to the spark plug, which may also achieve a rapid combustion and improve the thermal efficiency. It is worth noting that the corresponding relationship between thermal efficiency and reentrant ratio is non-monotonic, that is, it is not that the more severe reentrant characteristic is, the higher the thermal efficiency of the engine is, but that different inlet tumble characteristics needs to be matched and optimized respectively.

In one embodiment, if the piston 10 is a piston having a reentrant combustion chamber, the ratio of the top opening width d of the reentrant recessing structure 24 to the outer diameter D of the piston 10 (i.e., the reciprocal of the above reentrant ratio) is 0.53. Under this value, the piston having the reentrant combustion chamber may maximize the rapid combustion effect in the cylinder and the engine's thermal efficiency.

Figure 10:
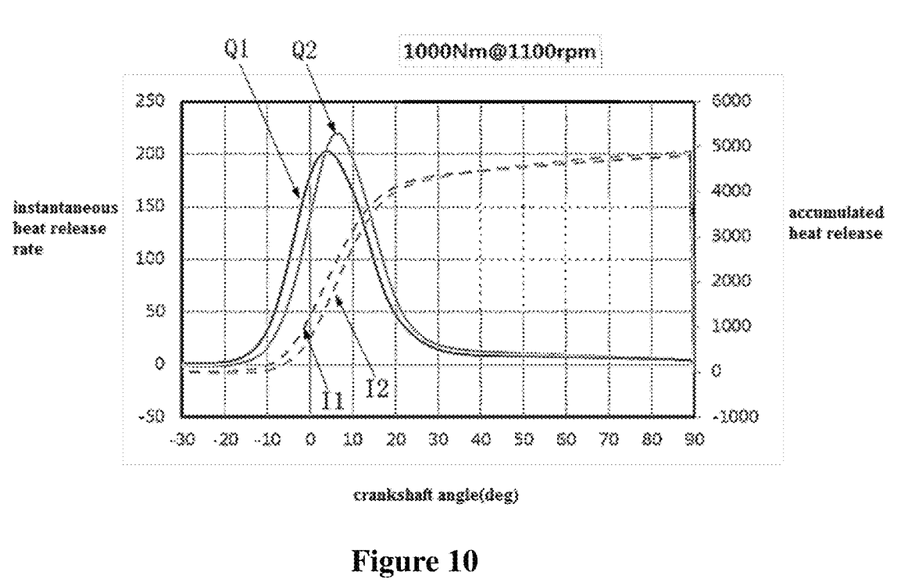
FIG. 10 is a comparison diagram of the test results of the heat release rate and heat release between the weak tumble flow fast combustion system and the traditional combustion system according to one embodiment of the present application.
Figure 11:
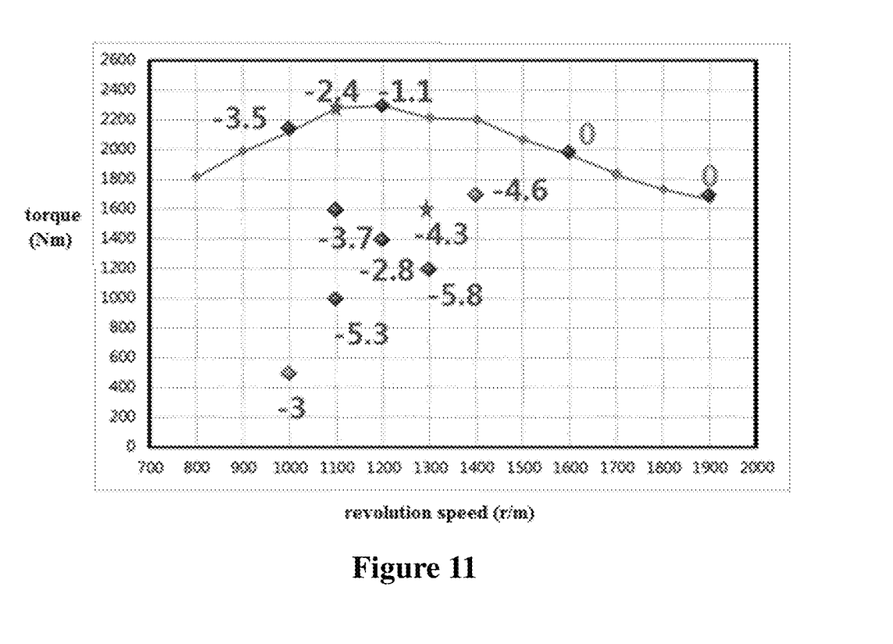
FIG. 11 is a comparison diagram of gas consumption test results between a gas engine according to one embodiment of the present application and a traditional model.

Through the parameter combination design of the curvature radius R of the arc-shaped guide surface 18 of the intake duct 14, the inclination angle θ of the flowing-down guide surface 19, the eccentric distance A of the eccentric chamfer 113 and the opening ratio α of the piston 10, the present application has carried out a simulation test. The combustion effect is obviously improved when compared with the traditional combustion system model. Referring to FIG. 10 and FIG. 11, FIG. 10 is a comparison diagram of the test results of the heat release rate and heat release between the weak tumble flow fast combustion system and a traditional combustion system in a specific embodiment of the present application; FIG. 11 is a comparison diagram of gas consumption test results between a gas engine in a specific embodiment of the present application and a traditional model. It may be clearly seen from FIG. 10 that the instantaneous heat release rate Q1 and the accumulated heat release I1 of the present disclosure are both advanced when compared with the instantaneous heat release rate Q1 and the accumulated heat release rate I1 of the traditional combustion system in the normal working condition area, which indicates that the combustion speed of the present application is accelerated when compared with the traditional combustion system. Meanwhile, compared with the traditional combustion system, the instantaneous heat release rate peak value of this solution is reduced, which indicates that the combustion system of the present application is beneficial to reducing the in-cylinder temperature peak value. It may be seen from FIG. 11 that the solution of the present application has a good advantage of reducing gas consumption in normal working conditions, while in high-speed, heavy-load working conditions (close to the rated point), the gas consumption of the solution of the present application is equivalent to that of the original solution.

In addition, it is noted that the above-mentioned parameter combination mode for the curvature radius R of the arc-shaped guide surface 18, the acute angle θ formed by the flowing-down guide surface 19, the eccentric distance A of the eccentric chamfer 113 and the opening ratio α of the piston 10 is only a combination solution given by the present application in order to adapt to most engines. In the actual application process, corresponding adjustments may be made according to actual requirements.

Generally speaking, the intake duct 14 includes a main intake duct 140, an inner intake duct 141 and an outer intake duct 142. The inner intake duct 141 and the outer intake duct 142 are branched downstream of the main intake duct 140. However, for the inner intake duct 141 and the outer intake duct 142, there are some differences in their flow capacity when the duct flow is designed. For example, the differences in the length and direction of the duct arrangement may lead to differences in their flow capacity. In this solution, the air inlet port of the main intake duct 140 communicates with the air inlet stabilizing cavity 23, and the inner intake duct 141 is closer to the air inlet stabilizing cavity 23 than the outer intake duct 142, and the flow capacity of the inner intake duct 141 is greater than the flow capacity of the outer intake duct 142.

It is noted that when the engine is at low speed and low load, the intake air demand is small, the gas flow in the intake duct 14 is low, and the engine supercharging capacity is weak. The gas is mainly sucked into the cylinder by the negative pressure generated when the piston 10 moves downwards, and the flow distribution of the inner and outer ducts is relatively balanced. However, when the engine is at high speed and high load, the intake demand is large, the gas flow in the intake duct 14 is relatively high, and the engine has strong supercharging capacity, and the gas is squeezed into the cylinder, so the difference of flow distribution between the inner and outer ducts is intensified. Indeed, the formation and maintenance of weak tumble flow are favorable when the inner intake duct 141 and the outer intake duct 142 are in balanced communication.

Therefore, in the present application, an injection hole 21 is formed at one side, facing the air inlet stabilizing cavity 23, of the main intake duct 140, and the injection hole 21 is communicated with the air inlet stabilizing cavity 23 through a bypass duct 22. With this arrangement, during the air intake process, the gas in the air inlet stabilizing cavity 23 is injected from the injection hole 21 into the main intake duct 140 by the bypass duct 22, and part of the gas in the main intake duct 140 is blown to the other side far away from the air inlet stabilizing cavity 23, that is, to the side corresponding to the outer intake duct 142. Therefore, the outer intake duct 142, which originally had a weak flow capacity, may be distributed more air flow, thus contributing to a more balanced gas flow between the inner intake duct 141 and the outer intake duct 142.

Of course, in this solution, the injection hole 21 may also be directly opened on the outer intake duct 142 with weak flow capacity, that is, an injection hole 21 is provided at one side of the outer intake duct 142. With this arrangement, the gas in the air inlet stabilizing cavity 23 may be directly replenished into the branch duct with weak flow capacity through the injection hole 21, thereby achieving the flow balance between the inner intake duct 141 and the outer intake duct 142, and the formation and maintenance of weak tumble flow may be realized more easily.

It is noted that, in a specific embodiment, the outer intake duct 142 is a tangential duct, and the inner intake duct 141 is a straight duct, and the projection of the extending direction of the straight duct on the bottom surface of the cylinder head 11 is in the same direction as the central connecting line of the intake throat 111 and the exhaust throat 112.

Specifically, the cylinder head structure of the present application is modified from the diesel engine cylinder head. In the vortex duct of the original diesel engine cylinder head, the original outer intake duct is a tangential duct, and the original inner intake duct is a spiral duct. In this solution, the original inner intake duct is changed into the weak tumble duct so that the spiral feature of the original inner intake duct is removed, and it is changed into the inner straight duct to improve the circulation capacity. Compared with the spiral duct of the original diesel engine, the inner straight duct removes the spiral feature and enhances the flow capacity, while the outer tangential duct has a longer overall length than the straight duct, and the airflow entering the cylinder is significantly affected by the bending action of the cylinder wall. Therefore, the flow capacity of the inner intake duct 141 is greater than the flow capacity of the outer intake duct 142. In this solution, the injection hole 21 is arranged close to the inner straight duct, and the air flow in the air inlet stabilizing cavity 23 is introduced into the main intake duct 140 through the bypass duct 22 by the injection hole 21, and the air flow is blown from the side of the inner intake duct 141 to the side of the outer intake duct 142, thereby increasing the air flow density of the outer intake duct 142 and reasonably adjusting the flow distribution of the inner and outer ducts to make it more balanced.

It is noted that the bypass duct 22 in this solution may be formed by machining or casting. In this solution, a flow regulating valve is also provided on the bypass duct 22, which is used for controlling and regulating the flow of the supplementary air flow from the injection hole 21 and controlling the opening and closing of the bypass duct 22. It is noted that the flow regulating valve may be designed as a mechanical or electronic regulating valve. According to the solution, the intake air flow may be adjusted evenly by controlling the opening and closing of the flow regulating valve, and the make-up air flow may be adjusted by changing the opening of the flow regulating valve, so that the intake air balance adjustment is more flexible and accurate.

Specifically, when the engine is at low speed and low load, the intake demand is small, and the flow distribution between the inner and outer ducts is relatively balanced. Therefore, the flow regulating valve is closed at this time, and no gas enters the intake duct 14 from the injection hole 21. When the engine is at high speed and high load, the intake demand is large, the gas flow in the intake duct 14 is relatively high, and the engine has strong supercharging capacity, and the gas is squeezed into the cylinder, so the difference of flow distribution between the inner and outer ducts is intensified. Therefore, at this time, the flow regulating valve is opened, and the gas enters the main intake duct 140 from the injection hole 21, so that the outlet flow of the inner intake duct 141 decreases, while the outlet flow of the outer intake duct 142 increases, thus balancing the flow of the inner and outer ducts.

Further in one embodiment, an equivalent flow cross-section of the bypass duct 22 is gradually reduced from the air inlet stabilizing cavity 23 to the injection hole 21. With this arrangement, the air flow may be injected into the intake duct 14 in an accelerated state through the bypass duct 22 whose cross section is tapered along the air flow direction, and the pressurized injection effect of the injection hole 21 is enhanced.

To sum up, the solution of the present application optimizes the structure of the original combustion system to form a new weak tumble movement on the premise of ensuring the circulation capacity. With the piston having the dish combustion chamber or the piston having the reentrant combustion chamber, tumble flow may be better formed and maintained in the intake stroke and compression stroke. At the end of compression stroke, tumble flow is crushed into small-scale turbulence after being squeezed by piston. The enhancement of small-scale turbulence increases turbulent kinetic energy of mixed gas, increases the speed of flame propagation, shortens combustion duration, improves combustion characteristics and overall stability, effectively reduces cycle variation and improves gas utilization rate. Meanwhile, the fast combustion characteristics of the weak tumble flow fast combustion system of the present application break through the knock bottleneck of the traditional combustion mode, and may allow the use of pistons with higher compression ratio (the compression ratio may be increased by 10%), and the knock is in a controllable range; the present application further improves the utilization rate of fuel gas, and reduces the gas consumption in normal working conditions by 2%-3% on average.

In addition, considering the feasibility of products, the present application generates corresponding weak tumble flow by changing the structure of the intake duct in the cylinder head on the basis of the existing diesel engine, and does not need to change the fire surface of the cylinder head from the original flat top type to the canopy type. The advantage of this treatment is that, as the present application only needs to modify the structure of the intake duct, the structures of the intake valve, the exhaust valve, the exhaust duct and the like do not need to be changed, and the positions of fastening bolt holes of the cylinder head and the engine body remain unchanged, so that all external interfaces of the cylinder head may be ensured to remain unchanged, therefore, it may be ensured that the air distribution mechanism and the air system are maintained as they are, thereby greatly reducing the cost of product design changes and improving product feasibility.

The present application further provides a gas engine including the above-mentioned weak tumble flow fast combustion system. The derivation process of the beneficial effects produced by the gas engine is generally similar to the derivation process of the beneficial effects brought about by the weak tumble flow fast combustion system, so it may not be repeated here.

The above description of the disclosed embodiments enables those skilled in the art to implement or use the present application. Various modifications to the embodiments are apparent to the person skilled in the art, and the general principle herein can be implemented in other embodiments without departing from the spirit or scope of the present application. Therefore, the present application will not be limited to the embodiments described herein, but should be in accordance with the broadest scope consistent with the principle and novel features disclosed herein.

What is claimed is:

1. A weak tumble flow fast combustion system, comprising a piston, a cylinder head, an intake duct and an exhaust duct, wherein a combustion chamber is formed between a top of the piston and the cylinder head, an intake throat and an exhaust throat are provided on the cylinder head, a section of the intake duct close to the intake throat is a tumble guide duct, an axis of the tumble guide duct is arranged obliquely with respect to a bottom surface of the cylinder head, and an upper side surface of the tumble guide duct is an flowing-down guide surface arranged obliquely with respect to the bottom surface of the cylinder head, a lower side surface of the tumble guide duct is an arc-shaped guide surface recessed toward the bottom surface of the cylinder head, an eccentric chamfer is provided at a lower end of the intake throat, and an eccentric direction of the eccentric chamfer is offset along a direction of a line of connecting a center of the intake throat to the exhaust throat.

2. The weak tumble flow fast combustion system according to claim 1, wherein a radius of a curvature of the arc-shaped guide surface is 60-80 mm, and an included angle between the flowing-down guide surface and the bottom surface of the cylinder head is 40 degrees-80 degrees.

3. The weak tumble flow fast combustion system according to claim 1, wherein an eccentric distance of the eccentric chamfer with respect to the intake throat is 1 mm-3 mm.

4. The weak tumble flow fast combustion system according to claim 1, wherein the piston has a dish combustion chamber, a dish recessing structure is provided at a top of the piston having the dish combustion chamber, and a cross-sectional width of the dish recessing structure from the bottom to the top gradually increases;

or, the piston has a reentrant combustion chamber, a reentrant recessing structure is provided at a top of the piston having the reentrant combustion chamber, and a cross-sectional width of the reentrant recessing structure from the bottom to the top gradually decreases.

5. The weak tumble flow fast combustion system according to claim 4, wherein if the piston has the dish combustion chamber, a side wall of the dish recessing structure is a tapered surface structure arranged around an axis of the piston, and an inclination angle of a longitudinal section of the side wall of the dish recessing structure relative to the axis of the piston is 10-15 degrees;

if the piston has the reentrant combustion chamber, a ratio of a top opening width of the reentrant recessing structure to an outer diameter of the piston is 0.53.

6. The weak tumble flow fast combustion system according to claim 1, wherein the intake duct comprises a main intake duct, an inner intake duct, and an outer intake duct, and the inner intake duct and the outer intake duct are branched downstream of the main intake duct, an air inlet port of the main intake duct is communicated with the air inlet stabilizing cavity, the inner intake duct is closer to the air inlet stabilizing cavity than the outer intake duct, and a communication capacity of the inner intake duct is greater than a communication capacity of the outer intake duct, an injection hole is opened on one side of the outer intake duct or a side, facing the air inlet stabilizing cavity, of the main intake duct, and the injection hole communicates with the air inlet stabilizing cavity through a bypass duct.

7. The weak tumble flow fast combustion system according to claim 6, wherein the outer intake duct is a tangential duct and the inner intake duct is a straight duct, and a projection of an extending direction of the straight duct on the bottom surface of the cylinder head is consistent with a direction of a central connecting line of the intake throat and the exhaust throat.

8. The weak tumble flow fast combustion system according to claim 6, wherein a flow regulating valve is provided on the bypass duct.

9. The weak tumble flow fast combustion system according to claim 6, wherein an equivalent flow cross-section of the bypass duct is gradually reduced from the air inlet stabilizing cavity to the injection hole.

10. A gas engine, comprising the weak tumble flow fast combustion system according to claim 1.

* * * * *